United States Patent [19]

Yoneyama

[11] Patent Number: 4,838,228

[45] Date of Patent: Jun. 13, 1989

[54] IGNITION TIMING CONTROL APPARATUS

[75] Inventor: Shuuichi Yoneyama, Kanagawa, Japan

[73] Assignee: Nissan Motor Company, Limited, Japan

[21] Appl. No.: 184,125

[22] Filed: Apr. 20, 1988

[30] Foreign Application Priority Data

Apr. 21, 1987 [JP] Japan ................... 62-59277[U]

[51] Int. Cl.$^4$ .............................................. F02P 5/04
[52] U.S. Cl. ..................... 123/425; 123/435
[58] Field of Search ............... 123/425, 435, 492, 419, 123/493, 422, 417; 364/431.08, 431.07

[56] References Cited

U.S. PATENT DOCUMENTS

| 4,694,800 | 9/1987 | Morita | 123/425 |
| 4,715,342 | 12/1987 | Nagai | 123/425 |
| 4,726,339 | 2/1988 | Nagai | 123/425 |
| 4,729,358 | 3/1988 | Morita et al. | 123/425 |
| 4,736,723 | 4/1988 | Nagai | 123/425 |
| 4,766,545 | 8/1988 | Nagai | 123/425 |

Primary Examiner—Raymond A. Nelli
Attorney, Agent, or Firm—Lowe, Price, LeBlanc, Becker & Shur

[57] ABSTRACT

An engine ignition timing control apparatus includes a control circuit for calculating an appropriate value for engine ignition timing. The control circuit determines a region where the engine is operating from a relationship programmed thereinto. The relationship defines a knock control unnecessary region at low engine speed or at low engine loads, a knock control necessary region at intermediate engine speeds and at high engine loads, and a knock control impossible region at high engine speeds and at high engine loads. The knock control necessary region is divided into a plurality of knock control necessary region segments. The control circuit calculates correction factors for the respective knock control necessary region segments based on knock intensity. The control circuit also calculates a feed-forward correction factor for the knock control impossible region based on the correction factors calculated for the respective knock control necessary region segments. The calculated ignition timing value is modified according to the correction factor calculated for the determined engine operating region.

3 Claims, 5 Drawing Sheets

IGNITION TIMING CONTROL APPARATUS

BACKGROUND OF THE INVENTION

This invention relates to an engine control apparatus and, more particularly to an apparatus for controlling the ignition timing of an internal combustion engine.

Japanese Patent Pulication No. 58-13749 discloses an engine ignition timing control apparatus including a control circuit which calculates an appropriate value for the ignition timing of the engine. The control circuit also determines one of engine operating regions where the engine is operating from a relationship programmed therein. The relationship defines engine operating region as a function of engine speed and engine load. The relationship defines a knock control unnecessary region at low engine speed or at low engine loads where almost no knock occurs, a knock control necessary region at intermediate engine speed and at high engine loads where there is a great tendency toward knock, and a knock control impossible region where knock detection is impossible due to great engine vibrations and sounds. The control circuit calculates a correction factor $\beta$ as a function of the knock intentity, the correction factor $\beta$ being used in modifying the calculated ignition timing value when the engine is operating in the knock control necessary region.

When the engine is operating with knocking in the knock control necessary region, the calculated ignition timing value is modified to retard the ignition timing so as to suppress knock by substracting the correction factor $\beta$ from the calculated ignition timing value. Whem the engine is operating without knocking in the control necessary region, the calculated ignition timing value is modified to advance the ignition timing so as to bring the knock intentity to an acceptable limited level by adding the correction factor $\beta$ to the calculated ignition timing value. When the engine is operating in the knock control impossible region, the last correction factor $\beta$ is used to modify the calculated ignition timing value.

One serious problem associated with such a conventional engine ignition timing control apparatus is that appropriate knock control cannot be obtained sometimes in the knock control impossible region. This particularly ture when the engine operation shifts from the knock control necessary region into the knock control impossible region immediately after the engine operation shifts from the knock control unnecessary region into the knock control necessary region. This problem is stemmed mainly from the fact the knock control necessary region expands over a relatively wide engine speed range.

SUMMARY OF THE INVENTION

It is, therefore, a main object of the invention is to provide an improved engine ignition timing control apparatus which can provide good knock control over the whole regions of operation of the engine.

There is provided, in accordance with the invention, an apparatus for controlling an internal combustion engine including ignition control means for controlling the ignition timing of the engine. The apparatus comprises a load sensor for generating an electrical signal indicative of the load on the engine, a speed sensor for generating an electrical signal indicative of the speed of the engine, and a knock sensor for generating an electrical signal indicative of the knock intensity. The apparatus also comprises a control circuit coupled to the sensors. The control circuit includes means for calculating an appropriate ignition timing value corresponding to a setting of the ignition contrOL means as a function of engine speed and engine load, means for dertermining one of engine operating regions where the engine is operating from a relationship programmed therein, the relationship defines engine operating region as a function of engine speed and engine load, the relationship defining a knock control unnecessary region at low engine speeds or at low engine loads, a knock control necessary region at intermediate engine speeds and at high engine loads, and a knock control impossible region at high engine speeds and at high engine loads, the knock control necessary range being divided into a plurality of knock control necessary region segments having different engine speed ranges, means for calculating correction factors for the respective knock control necessary region segments based on the knock intensity, the correction factor calcualting means including means for calculating a feed-forward correction factor for the knock control impossible region based on the correction factors calculated for the respective knock control necessary region segments, means for modifiying the calculated ignition timing value based on the correction factor calculated for the determined engine operating region, and means for converting the modified ignition timing value into a setting of the ignition control means.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
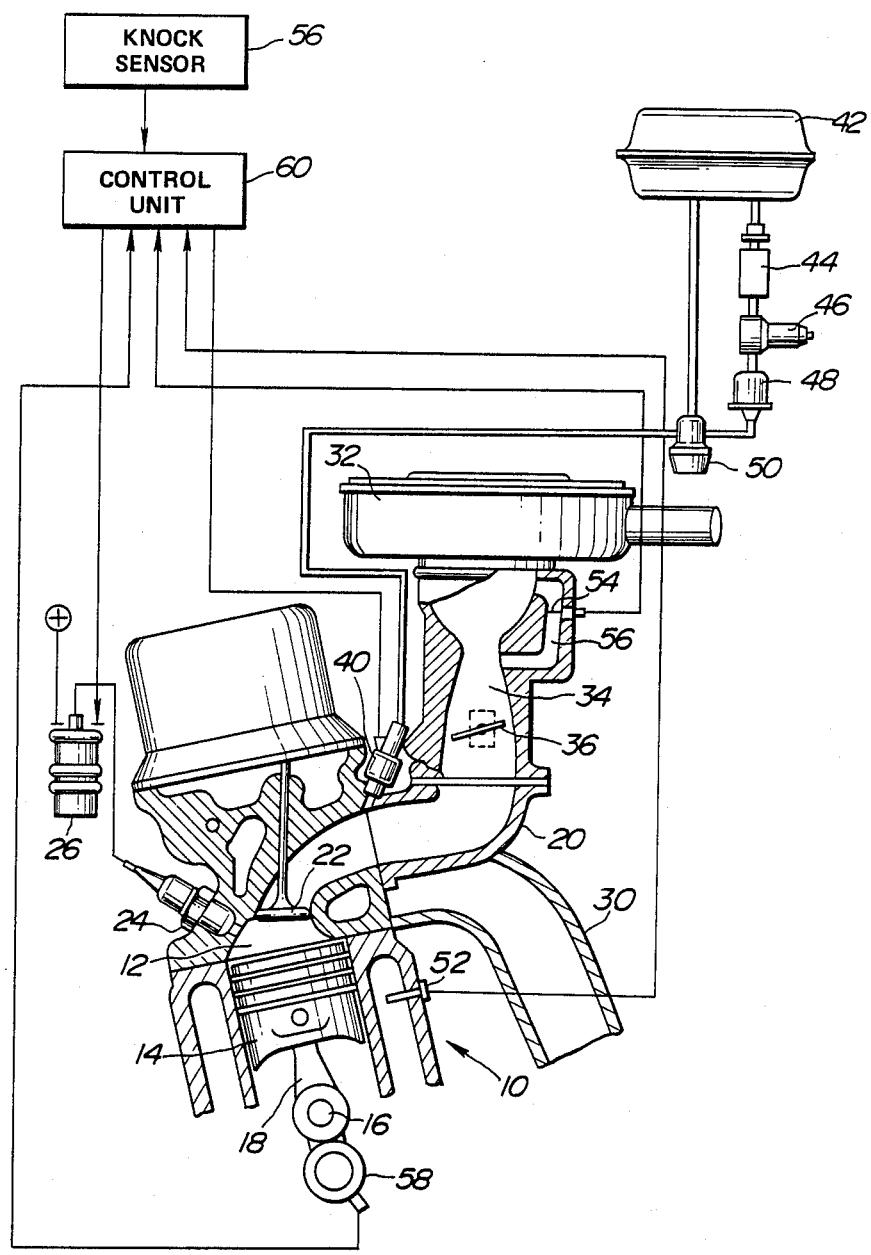
FIG. 1 is a schematic sectional view showing one embodiment of an engine ignition timing control apparatus made in accordance with the invention.

With rference to the drawings, and in particular to FIG. 1, there is shown a schematic diagram of an engine control system embodying the invention. An internal combusion engine, generally designated by the numeral 10, for an automotive vehicle includes a combustion chamber or cylinder 12. A piston 14 is mounted for reciprocal motion within the cylinder 12. A crankshaft 16 is supported for rotation within the engine 10. Pivotally connected to the piston 14 and the crankshaft 16 is a connecting rod 18 used to produce rotation of the crankshaft 16 in response to reciprocation of the piston 14 within the cylinder 12.

An intake manifold 20 is connected with the cylinder 12 through an intake port with which an intake valve 22 is in cooperation for regulating an entry of combustion ingredients into the cylinder 12 from the intake manifold 20. A spark plug 24 is mounted in the top of the cylinder 12 for igniting the combustion ingredients within the cylinder 12 when the spark plug 24 is energized by the presence of high voltage electrical energy from an ignition coil 26. An exhaust manifold 30 is connected with the cylinder 12 through an exhaust port with which an exhaust valve is in cooperation for regulating the exit of combustion products, exhaust gases, from the cylinder 12 into the exhaust manifold 20. The intake and exhaust valves are driven through a suitable linkage with the crankshaft 16.

Air to the engine 10 is supplied through an air cleaner 32 into an induction passage 34. The amount of air permitted to enter the combustion chamber 12 through the intake manifold 20 is controlled by a butterfly throttle valve 36 situated within the induction passage 34. The throttle valve 36 is connected by a mechanical linkage to an accelerator pedal. The degree of rotation of the throttle valve 36 is manually controlled by the operator of the engine control system.

A fuel injector 40 is connected to a fuel supply system when includes a fuel tank 42, a fuel pump 44, a fuel damper 46, a fuel filter 48, and a pressure regulator 50. The fuel pump 44 is electrically operated and is capable of maintaining sufficient pressure. The fuel damper 46 attenuates the fuel pressure to an extent. The fuel filter 48 prevents any contaminants from reaching the fuel injector 40. The pressure regulator 50 maintains the pressure differential across the fuel injector 40 at a constant level. This regulation is accomplished by a variation in the amount of excess fuel returned by the regulator 50 to the fuel tank 42. The fuel injector 40 opens to inject fuel into the induction passage 34 when it is energized by the pressure of the electrical current. The length of the electrical pulse, that is, the pulse-width, applied to the fuel injector 40 determines the length of time the fuel injector opens and, thus, determines the amount of fuel injector into the intake manifold 20.

In the operation of the engine 10 fuel is injected through the fuel injector 40 into the intake manifold 20 and mixes with the air therein. When the intake valve opens, the air-fuel mixture enters the combustion chamber 12. An upward stroke of the piston 14 compresses the air-fuel mixture, which is then ignited by a spark produced by the spark plug 24 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaustr manifold 30.

Although the engine 10 as illustrated in FIG. 1 has only one combustion chamber 12 fromed by a cylinder and piston, it should be understood that the engine control system described here is equally applicable to a multi-cylinder engine. Thus, it should be understood that a four-cylinder engine has four cylinders, four intake valves, four exhaust valves, four reciprocating pistons, four fuel injectors and four spark plugs to ignite the air-fuel mixture within the combustion chambers and that a six-cylinder engine has six cylinders, six intake valves, six exhaust valves, six reciprocating pistons, six fuel injectors and six spark plugs to ignited the air-fuel mixture within the combustion chambers. It should also be understood that the engine control system descirbed here is equally applicable to a multi-cylinder engine having a plurality of fuel injectors arranged to be actuated singly or in groups of varying numbers in a sequential fashion as well as simultaneously. In addition, it should be understood that the engine control system described here is equally applicable to a multi-cylinder engine of the single point injection (SPI) type having a single fuel injector arranged to inject fuel into the induction passage 34.

The amount of fuel metered to the engine, this being determined by the width of the electrical pulses applied to the fuel injector 40, the fuel-injection timing, and the ignition-system spark timing are repetitively determined from calculations performed by a digital computer, these calculations being based upon various conditions of the engine that are sensed during its operation. These sensed conditions include engine temperature, intake air flow, engine knock intensity and engine speed. Thus, a cylinder-head coolant temperature sensor 52, a flow meter 54, a knock sensor 56, and a crankshaft position sensor 58 are connected to a control unit 60.

The cylinder-head coolant temperature snesor 52 may comprise a thermistor mounted in the engine cooling system. The thermistor is connected in an electrical circuit capable of producing a DC voltage having a variable level proportional to coolant temperture. The flow meter 54 comprises a thermosensitive wire placed in a bypass passage 34a provided for the induction passage 34 upstream of the throttle valve 36. The knock sensor 56 may comprise an accelerometer mounted on the engine for sensing engine vibrations due to engine operation. The accelerometer is connected in an electrical circuit capable of producing a knock signal indicative of knock intensity. The crankshaft position sensor 58 produces a series of crankshaft position electrical pulses C1 each corresponding to one degree of rotation of the engine crankshaft and a series of reference electrical pulses Ca at a predetermined number of degree before the top dead center position of each engine piston.

Figure 2:
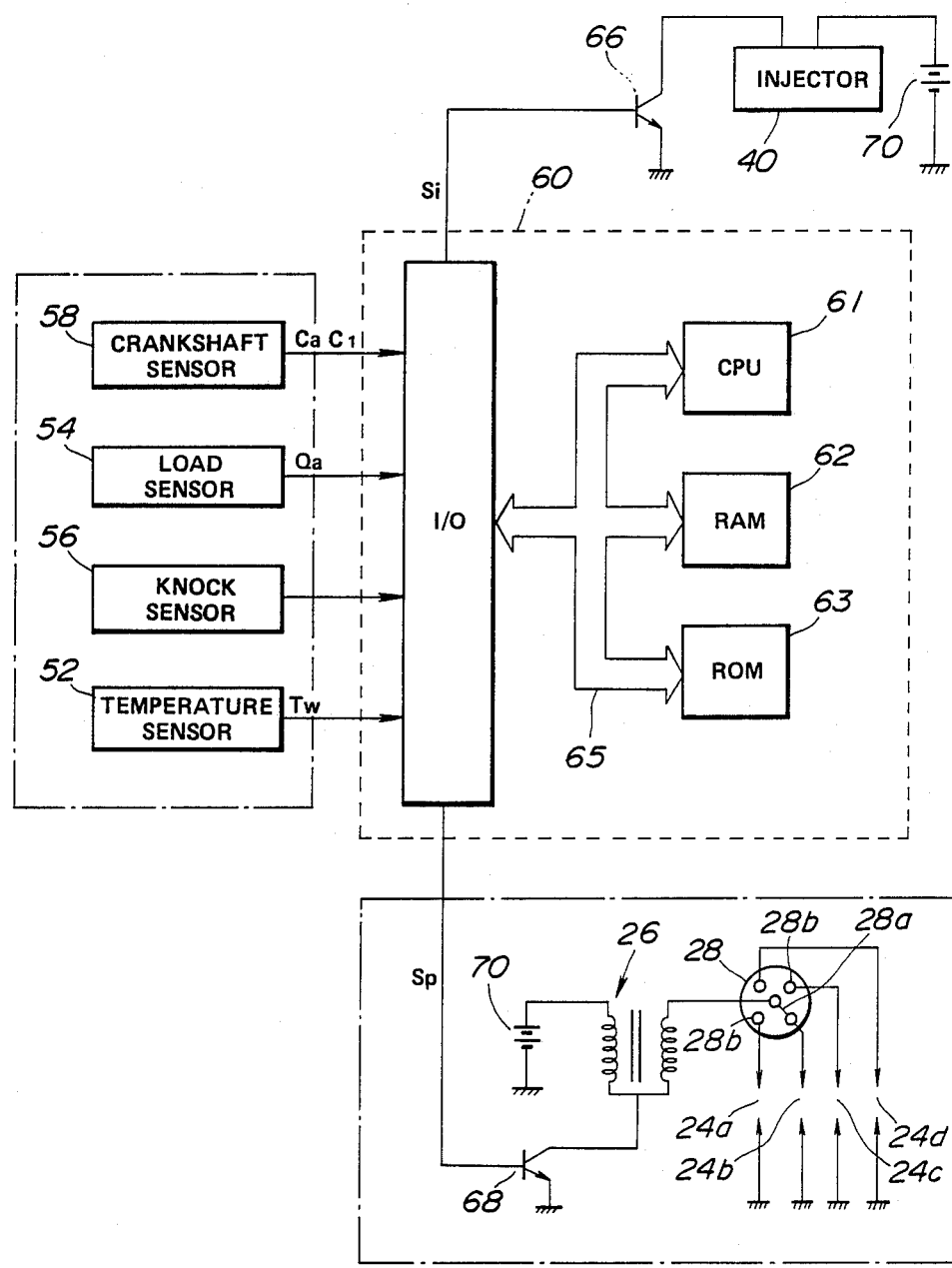
FIG. 2 is a block diagram showing the detailed arrangement of the control unit of FIG. 1.

Referring to FIG. 2, the control unit 60 comprises a digital computer which includes a central processing unit (CPU) 61, a random access memory (RAM) 62, a read only memory (ROM) 63, and an input/output control circuit (I/O) 64. The central processing unit 61 communicates with the rest of te computer via data bus 65. The input/output control circuit 64 includes a counter which counts the reference pulses Ca fed from the crankshaft position sensor 58 converts its count into an engine speed indication digital signal for application to the central processing unit 61. Teh input-output control circuit 64 also includes an analog-to-digital converter which receives analog sinals from the flow meter 54, and other sensors and converts them into digital form for application to the central processing unit 61. The A to D conversion process is initiated on command from the central processing unit 61 which selects the input channel to be converted. The read only memory 63 contains the program for operating the central processing unit 61 and further contains appropriate data in look-up tables used in calculating appropriate values for fuel delivery requirements and ignition-system spark timing. Control words specifying desired fuel delivery requirements and ignition-system spark timing are periodically transferred by the central processing unit 61 the fuel-injection and spark-timing control circuits included in the input/output control circuit 64. The fuel injection control circuit converts the received control word into a fuel injection pulse signal Si for application to a power transistor 66. The power transistor 66 connects the fuel injector 40 to the engine battery 70 for a time period determined by the width of the fuel injection control pulse signal Si. The spark timing control circuit converts the received control word into a spark timing control pulse signal Sp for application to a power transistor 68. The power transistor 68 connects the ignition coil 26 to the engine battery 70 for a time period determined by the width of the spark timing control pulse signal Sp.

The ignition system includes a distributor 28 connected with the ignition coil 26 to energize the spark plugs 24 of the engine. For this purpose, the ignition coil 26 has a primary winding connected across the engine battery 70 through the power transistor 68. The ignition coil 26 has a high voltage terminal connected to a rotor 28a of the distributor 28. The rotor 28a is driven at one-half the rotational velocity of the crankshaft 16. The distributor 28 has electrical contacts 28b each of which is connected in the usual manner by separate elecctrical leads to the spark plugs 24 of the engine. As the distributor rotor 28a rotates, it sequentially contacts the electrical contacts 28b to permit high voltage electrical energy to be supplied at appropriate intervals to the spark plugs 24, causing sparks to be generated across the gaps 24a, 24b, 24c and 24d of te respective spark plugs 24. The distributor 28 does not control ignition-system spark timing. Rather, spark timing is an independently controlled variable calculated through the use of the digital computer in a manner hereinafter described. It should be understood that the illustrated four cylinder engine is shown and described only to facilitate a more complete understanding of the engine control system embodying the invention.

Figure 3:
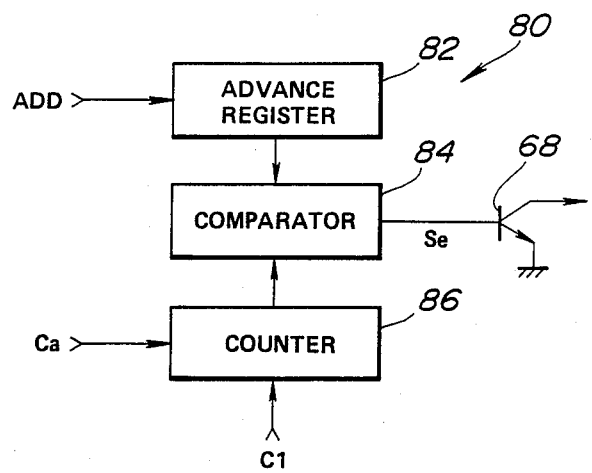
FIG. 3 is a block diagram showing the spark timing control circuit used in the control unit of FIG. 2.

Referring to FIG. 3, the spark timing control circuit, generally designated by the numeral 80, includes an advance register 82, a comparator 84 and a counter 86. The advance register 82 loads the calculated spark timing digital value ADD transferred thereto from the central processing unit 61. The counter 86 counts the crankshaft position pulses C1 fed thereto from the crankshaft position sensor 58. The counter 86 responds to a refernce pulse Ca fed thereto from the crankshaft position sensor 58 by clearing its count and starting its counting operation. The comparator 82 compares the count of the counter 86 with the digital value loaded on the advance register 82 and produces a control pulse signal Sc to the power transistor 68. This control pulse signal changes from a low level to a high level turning on the power transistor 68 when the counter 86 is reset. The control pulse signal Sc changes from the high level to the low level turning off the power transistor 68 when the count of the counter 86 reaches the value transferred to the advance register 82 from the central processing unit 61.

Figure 4A:
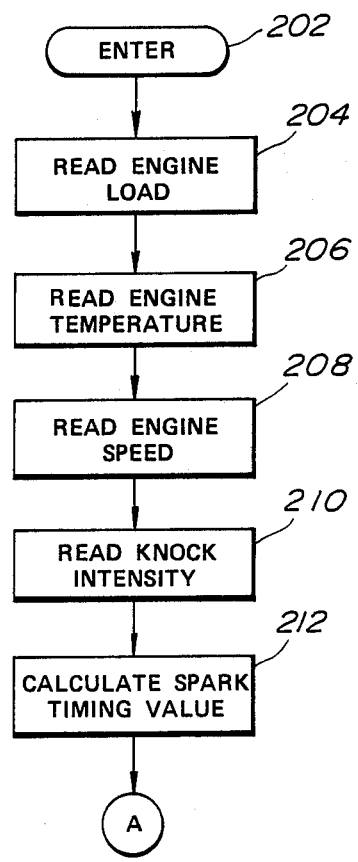
FIGS. 4A and 4B are flow diagrams illustrating the programming of the digital computer employed in the control unit.
Figure 4B:
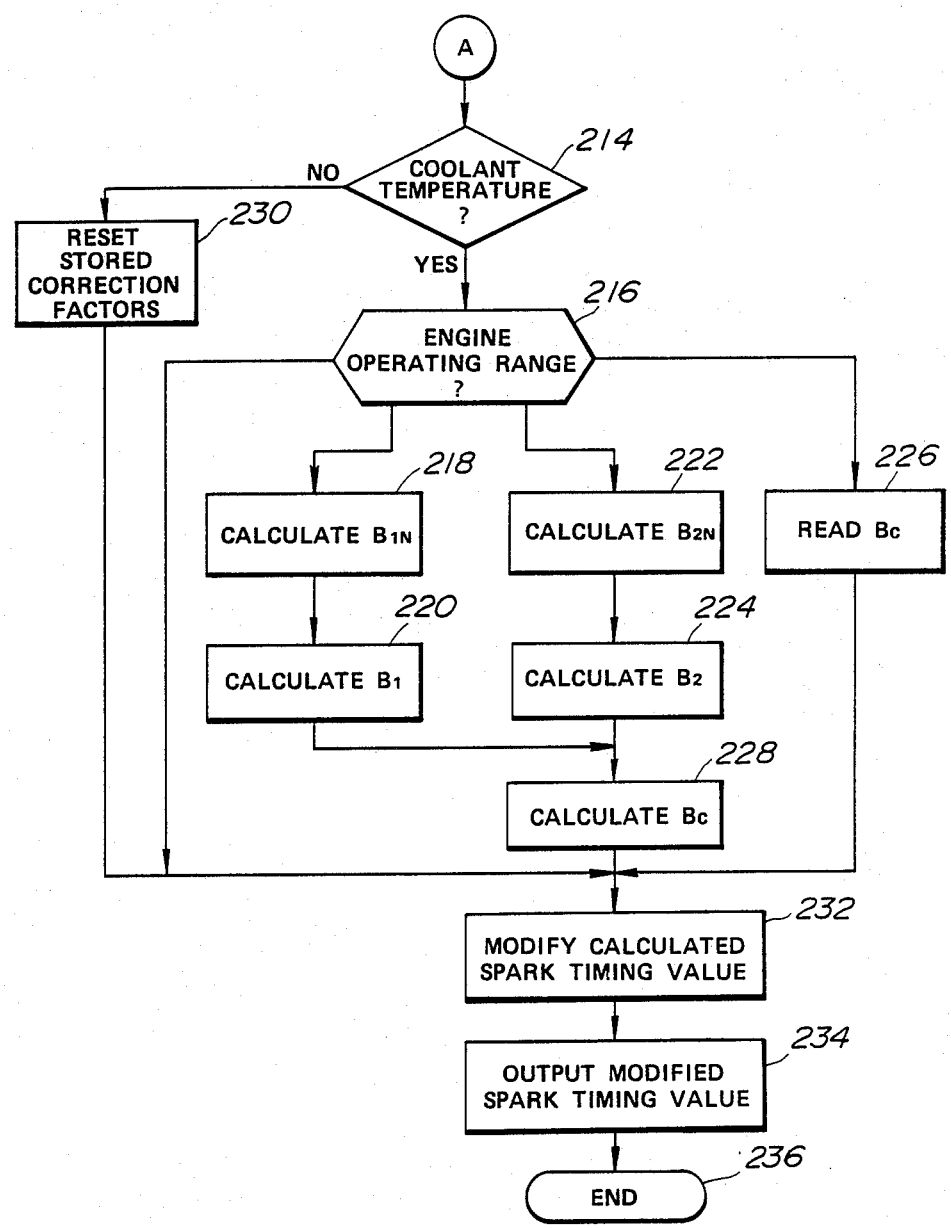

FIGS. 4A and 4B is a flow diagram illustrating the programming of the digital computer as it is used to determine a desired value for ignition-system spark timing.

The computer program is entered at the point 202 at predetermined time intervals or in synchronism with engine crankshaft rotation. Following this, the various inputs are read into the computer memory 62. Thus, at the point 204 in the program, the intake air flow signal Qa is converted to digital form and read into the computer memory 62. Similarly, at the point 206, the coolant temperature signal Tw is converted into digital form and read into the computer memory 62. At the point 208 in the program, the engine speed signal is read into the computer memory 62. At the point 210, the knock signal is read into the computer memory 62.

At the point 212 in the program, the central processing unit 61 calculates a desired value for ignition-system spark timing from a relationship programmed into the read only memory 63. This relationship defines ignition-system spark-timing as a function of engine load, as inferred from measurement of intake air flow, and engine speed in a manner well known in the art. The calculated value for ignition-system spark timing is stored into the random access memory 62.

Figure 5:
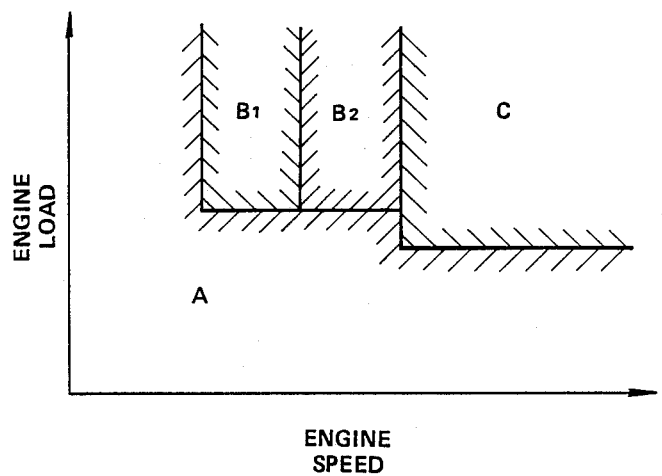
FIG. 5 is a diagram showing a relationship programmed into the digital computer for use in determining a region where the engine is operating.

At the point 214 in the program, a determination is made as to whether or not the coolant temperature is equal to or greater than a predetermined value. If the answer to this question is "yes", then the program proceeds to the point 216 where another determination is made as to which region the engine is operating in. This determination is made from a relationship programmed into the read only memory 63. This relationship is shown in FIG. 5 and it defines engine operating region as a function of engine speed and engine load. In FIG. 5, the character A designates a knock control unnecessary region determined at low engine speeds or at low engine loads where no knock control is required since almost no engine knock occurs in this region. A knock control necessary region is determined at intermediate engine speeds and at high engine loads where there is a great tendency toward knock. This knock control necessary region is divided into first and second knock control necessary region segments B1 and B2 having different engine speed ranges. The first knock control necessary region B1 is determined at engine speeds less than the engine speeds for which the second knock control necessary region B2 is determined. The character C designates a knock control impossible region determined at high engine speeds and at high engine loads where knock detection is impossible due to great engine vibrations and sounds.

If the engine is operating at low engine speeds or at low engine loads, then the knock control unnecessary region A is determined and the program proceeds directly to the point 232. If the engine operating range is the first knock control necessary region B1, then the program proceeds to the point 218. At the point 218, the central processing unit 61 calculates a first correction factor $\beta_{1N}$ from a relationship programmed into the read only memory 63. This relationship defines first correction factor $\beta_{1N}$ as a function of knock intensity. The first correction factor $\beta_{1N}$ is determined to advance the ignition-system spark timing so as to bring the knock intensity close to an acceptable limited level when the sensed knock intensity is less than the acceptable limited level and to retard the ignition-system spark timing so as to suppress knock when the sensed knock intensity is equal to or greater than the acceptable limited level. At the point 220 in the program, the central processing unit 61 calculates a new first correction factor $\beta_1$ as $\beta_1 = \beta_{1N}/2 + \beta_{10}/2$ where $\beta_{10}$ is the last value for first correction factor calculated when the engine is operating in the first knock control necessary region. The claculated new first correction factor $\beta_1$ is stored in the random access memory 62. Following this, the program proceeds to the point 228.

If the engine operating range is the second knock control necessary region B2, then the program proceeds to the point 222. At the point 222, the central processing unit 61 calculates a second correction factor $\beta_{2N}$ from a relationship programmed into the read only memory 63. This relationship defines second correction factor $\beta_{2N}$ as a function of knock intensity. The second correction factor $\beta_{2N}$ determined to advance the ignition-system spark timing so as to bring the knock intensity close to an accepatable limited level when the sensed knock intensity is less than the acceptable limited level and to retard the ignition-system spark timing so as to suppress knock when the sensed knock intensity is equal to or greater than the acceptable limited level. At the point 224 in the program, the central processing unit 61 calculates a new second correction factor $\beta_2$ as $\beta_2 = \beta_{2N}/2 + \beta_{20}/2$ where $\beta_{20}$ is the last value for secoond correction factor calculated when the engine is operating in the second knock control necessary region. The calculated new second correction factor $\beta_2$ is stored in the random access memory 62. Following this, the program proceeds to the point 228.

At the point 228 in the program, the central processing unit 61 calculates a feed-forward correction factor $\beta c$ as $\beta c = \beta_1 \times 4/10 = \beta_2 \times 6/10$. For this purpose, the central processing unit 61 reads the first correction factor $\beta_1$ and the second correction factor $\beta_2$. As can be seen from the equation, the second correction factor $\beta_2$ is weighted heavier than the first correction factor $\beta_1$. This calculation is made from the new first correction factor $\beta_1$ calculated at the point 220 and the last second correction factor $\beta_2$ read from the random access memory 62 when the engine is operating in the first knock control necessary region B1. Alterntively, the calculation is made from the last first correciton factor $\beta_1$ read from the random access memory 62 and the new second correction factor $\beta_2$ calculated at the point 224 when the engine is operating in the second knock control necessary region B2. The calculated feed-forward correction factor $\beta c$ is stored in the random access memory 62.

If the engine operating range is the knock control impossible range C, then the program proceeds to the point 226 where the central processing unit 61 reads the last feed-forward correction factor $\beta c$ from the random acess memory 62. Following this, the program proceeds to the point 232.

If the question inputted at the point 214 is "no", then it means that the engine is starting and the program proceeds to the point 230 where the correction factors $\beta_1$, $\beta_2$ and $\beta c$ stored in the random access memory 62 are reset to the respective initial values. Following this, the program proceeds to the point 232.

At the point 232 in the program, the central proceessing unit 61 modifies the calculated value for ignition-system spark timing using the correction factor $\beta_1$, $\beta_2$ or $\beta c$. For example, the central processing unit 61 uses the first correction factor $\beta_1$ when the engine is operating in the first knock control necessary region B1. In this case, the calculated value for ignition-system spark timing may be modified by adding the first correction factor $\beta_1$ to the calculated spark timing value to advance the spark timing when the sensed knock intensity is less than the acceptable limited level and by subtracting the first correction factor $\beta_1$ from the calculated spark timing value to retard the spark timing when the sensed knock intensity is equal to or greater than the acceptable limited level.

Similarly, the central processing unit 61 uses the second correction factor $\beta_2$ when the engine is operating in the second knock control necessary region B2. In this case, the calculated value for ignition-system spark timing may be modified by adding the second correction factor $\beta_2$ to the calculated spark timing value when the sensed knock intensity is less than the acceptable limited value and by subtracting the second correction factor $\beta_2$ from the calculated spark timing valie to retard the spark timing when the sensed knock intensity is equal to or greater than the acceptable limited level.

The central processing unit 61 uses the feed-forward correction factor $\beta c$ when the engine is operating in the knock control impossible region C. In this case, the calculated value for ignition-system spark timing may be modified by adding the feed-forward correction factor $\beta c$ to the calculated spark timing value when the sensed knock intensity is less than the acceptable limited value and by subtracting the feed-forward correction factor $\beta c$ from the calculated spark timing value to retard the spark timing when the sensed knock intensity is equal to or greater than the acceptable limited level.

When the coolant temperature is less than the predetermined value or when the engine is operating in the knock control unnecessary region A, no modification is made to the calculated value for ignition-system spark timing at the point 232.

At the point 234 in the program, the calculated or modified value for ignition-system spark timing is transferred to the advance counter 82 of the spark timing control circuit. Following this, the program proceeds to the end point 236.

According to the invention, the knock control necessary region is divided into first and second knock control necessary region segments B1 and B2 having different engine speed ranges. Correction factors $\beta_1$ and $\beta_2$ are claculated for the respective knock control necessary region segments B1 and B2. The last correction factors $\beta_1$ and $\beta_2$ are used to calculate a feed-forward correction factor $\beta c$ which is used in providing knock control when the engine is operating in the knock control impossible region. It is, therefore, apparant that the engine ignition timing control appartus of the invention can provide good knock control over the whole range of operation of the engine. It is preferable to provide better knock control in the knock control impossibl region by weighting the second correction factor $\beta_2$ heavier than the first correction fator $\beta_1$ when the calculated ignition timing is modified. However, the feed-forward correction factor $\beta c$ may be calculated by simply averaging the first and second correction factors $\beta_1$ and $\beta_2$ in some cases.

In addition, the knock control necessary region may be divided into three or more segments having different engine speed ranges. In this case, correction factors are calculated for the respective knock control necessary region sebments. It is preferable to obtain the feed-forward correction factor $\beta c$ by averaging the calculated correction factors with respective weights heavier for a correction factor calculated for a knock control necessary region segment having a greater engine speed range.

What is claimed is:
1. An apparatus for controlling an internal combustion engine including ignition control means for controlling the ignition timing or the engine. comprising:
   a load sensor for generating an electrical signal indicative of the load on the engine;
   a speed sensor for generating an electrical signal indicative of the speed of the engine;
   a knock sensor for generating and electrical signal indicative of the knock intensity; and
   a control circuit coupled to the sensors, the control circuit including means for calculating an appropriate ignition timing value corresponding to a setting of the ignition control means as a function of engine speed and engine load, means for determining one of engine operating regions where the engine is operating from a relationship programmed therein, the relationship defines engine operating region as a function of engine speed and engine load, the relationship defining a knock control unnecessary region at low engine speeds or at low engine loads, a knock control necessary region at intermediate engine speeds and at high engine loads and a knock control impossible region at high engine speeds and at high engine loads, the knock control necessary region being divided into a plurality of knock control necessary region segments having different engine speed ranges, means for calculating correction factors for the respective knock control necessary region segments based on the knock intensity, the correction factor calculating means including means for calculating a feed-forward correction factor for the knock control impossible region based on the correction factors calculated for the respective knock control necessary region segments, means for modifiying the calculated ignition timing value based on the correction factor calculated for the determined engine operation region, and means for converting the modified ignition timing value into a setting of the ignition control means.

2. The apparatus as claimed in claim 1, wherein the control circuti includes means for averaging the calculated correction factors for the respective knock control necessary region segments to calculate the feed-forward correction factor.

3. The apparatus as claimed in claim 2, wherein the control circuit includes means for averaging the calculated correction factors with respective weights heavier for a correction factor calculated for a knock control necessary region segment having a greater engine range to calculate the feed-forward correction factor.

* * * * *